United States Patent Office 3,636,223
Patented Jan. 18, 1972

---

3,636,223
THERAPEUTIC TREATMENT OF PARKINSON'S DISEASE
Pier Nicola Giraldi, Milan, and Vittorio Mariotti, Pesaro, Italy, assignors to Carlo Erba S.p.A., Milan, Italy
No Drawing. Continuation-in-part of application Ser. No. 769,441, Oct. 21, 1968. This application Mar. 13, 1969, Ser. No. 840,070
Claims priority, application Italy, Sept. 23, 1966, 21,973/66; Dec. 31, 1966, 31,818/66
(Filed under Rule 47(a) and 35 U.S.C. 116)
The portion of the term of the patent subsequent to Nov. 30, 1988, has been disclaimed
Int. Cl. A61k 27/00
U.S. Cl. 424—267
4 Claims

ABSTRACT OF THE DISCLOSURE 1-oxo-2-methyl - 3-(aminophenyl-p-ethoxypiperidino)-isoindoline and the process of making the same, is disclosed. This compound has anti-parkinson activity and is therapeutically useful.

---

This application is a continuation-in-part of Ser. No. 769,441, filed Oct. 21, 1968, now abandoned, which was a continuation of Ser. No. 669,380, filed Sept. 21, 1967, now abandoned.

The present invention relates to a new 2,3-substituted 1-oxo-isoindoline having anti-parkinson activity.

1-oxo-2-methyl-3 - (aminophenyl)-p-ethoxypiperidino)-isoindoline has the following general formula:

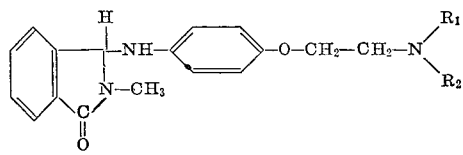

wherein $R_1$ and $R_2$, together with the nitrogen atom, are piperidino. This compound may be prepared by reacting 3-hydroxy-phthalimidine of the formula:

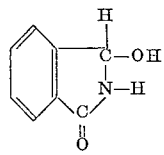

with an amine of the formula:

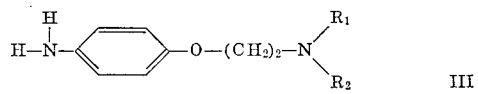

An alkylation is subsequently carried out on the intermediate product produced by the above reaction. This alkylation does not produce a high yield of the desired compound, because of the formulation of secondary products. The alkylation reaction produces a by-product compound of the formula:

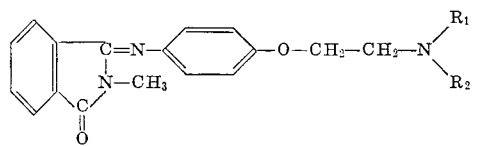

However, the above by-product compound may be reduced to provide the compound of the present invention.

The preferred method of preparing the compound of the present invention is by reacting 2-methyl-3-hydroxy-phthalimidine with thionylchloride, producing an intermediate compound of the formula:

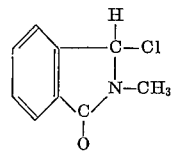

Subsequently, the above intermediate compound is reacted with the amine of Formula III above to produce the desired compound.

By reacting 1-oxo-2 - methyl-3-(aminophenyl-p-ethoxypiperidino)-isoindoline with organic and inorganic acids, such as, for instance, hydrochloric, sulfuric, citric and tartaric acids, the corresponding water soluble salts may be obtained. The pharmaceutically acceptable salts of 1-oxo-2-methyl - 3 - (aminophenyl-p-ethoxypiperidino)-isoindoline are useful because of their anti-parkinson activity.

The invention will be understood more readily by reference to the following examples; however, these examples are intended to illustrate the invention and are not to be construed to limit the scope of the invention.

EXAMPLE I 10 grams of 2-methyl-3-hydroxy-phthalimidine (0.061 moles) were dissolved in 50 ml. of anhydrous $CHCl_3$ (0.016 mole). To the solution so obtained was added 4.45 ml. of $SOCl_2$, and the resulting solution was stirred for 48 hours. Thereafter, 5.9 ml. of α-picoline (0.061 mole) and 13.6 grams of p-aminophenylethoxypiperidine (0.061 mole) were added to the solution and the mixture was then stirred for ten hours. 1-oxo-2-methyl-3-(aminophenyl-p-ethoxypiperidino) - isoindoline HCl was obtained by precipitation with petroleum ether. After reaction at room temperature with a stoichiometric amount of NaOH, the corresponding base (M.P. 115–116° C.) was obtained, having the formula:

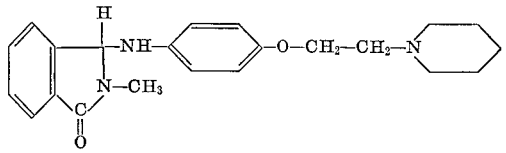

EXAMPLE II 5 grams of 3-hydroxy-phthalimidine (0.033 mole) were dissolved in 50 ml. of N-N-dimethylformamide. To the solution so obtained was added 10 grams of p-aminophenylethoxypiperidine (0.045 mole) and the resulting mixture was refluxed for five hours. Thereafter, the mixture was cooled with the addition of ice. The precipitate which was obtained was purified by crystallization from ethanol (99.9% purity), resulting in the recovery of 1-oxo-3-(aminophenyl-p-ethoxypiperidino)-isoindoline (M.P. 180–181° C.). 5 grams of the 1-oxo-3-(aminophenyl-p-ethoxypiperidino)-isoindoline (0.014 mole) were dissolved in 50 ml. of anhydrous N-N-dimethylformamide. To the solution so obtained was added 900 mg. of NaH (0.018 mole) and 1,095 ml. of $CH_3I$ (0.017 mole). The resulting solution was heated at 70° C. for one hour, and then poured into distilled water at room temperature. 1-oxo-2-methyl - 3-(aminophenyl-p-ethoxypiperidino)-isoindoline (M.P. 115–116° C.) was obtained.

1-oxo-2-methyl - 3 - (iminophenyl-p-ethoxypiperidino)-isoindoline (M.P. 106–108° C.) was also obtained. Reduction of this by-product produced the desired compound, 1-oxo-2-methyl - 3 - (aminophenyl-p-ethoxypiperidino)-isoindoline.

1-oxo-2-methyl - 3-(aminophenyl-p-ethoxypiperidino)-isoindoline has the appearance of a white-greyish crystalline powder, with melting point (not adjusted) on 118–120° C., and the following values on micro-analysis:

Theoretical (percent): C, 72.34; H, 7.43; N, 11.48; O, 8.75. Found (percent): C, 72.49; H, 7.50; N, 11.27; O, 8.95.

The colorimetric titer (amine determination after hydrolysis on heat) was 99.8%.

Specific pathogen-free $CF_1$ mice and CFE rats were used in the following experimentation. All these animals came from breeding stock of Carlo Erba Therapeutic Research Institute derived from a parent stock supplied by Carworth Farms. The rabbits used below belonged to the "hare-like" stock derived from the Gatto breeding farms.

Tremorine test

The test has been worked out by Everett et al. (Everett G.M., Nature 177, 1238 (1956); Everett G.M., Blockus L.E., Shepperd I.M., Fed. Proc. 15, 420 (1956); Everett G.M., Blockus L.E., Shepperd I.M., Science 124, 79 (1956)) and is based on the fact that 1,1'-(2-butynylen)-dipyrrholidine (Tremorine) of the formula:

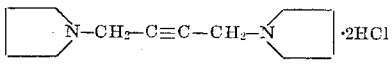·2HCl can produce in mice some of the symptoms typical to Parkinson's disease.

The investigation focused on three symptoms; namely, tremor or quivering, lachrymation and salivation, the first symptom corresponding to or indicating an activity at C.N.S. (central nervous system) level, whilst the others indicated an effect at V.N.S. (vegetative nervous system) level. Male rats weighting approximately 22–25 g. (fasting for 2 hours) were used for the test. The test animals were treated orally with the different doses of the various drugs under test in distilled water in a volume of 0.10 ml./10 g. bodyweight (1 - oxo-2-methyl-3-(aminophenyl-p-ethoxypiperidino)-isoindoline hydrochloride preparation took place at the moment of use). Tremorine hydrochloride in physiological salt solution was given after 30' to test mice by intra-peritoneal route at a posology of 20 mg./kg. in a volume of 0.10 ml./10 g. (In previous tests a dose of 20 mg./kg. Tremorine had proven to be the minimal to produce a maximal grade symptomatology.)

The evaluation was made 30 minutes after Tremorine treatment (1 hour after the treatment with the drug) and quite on random scheme, thus preventing the investigator from being influenced to any extent in his judgment by the sort of treatment undergone by the test animal.

Each of the three symptoms observed-tremor, lachrymation and salivation—was given points from 0 to 4 in a progressive crescendo according to the growing gravity of the symptom itself. Each drug was tested with 4 to 5 doses ranged on logarithmic scale.

An evaluation was carried out for each dose by calculating the inhibition percent of the symptom towards the controls observed in the same experimental session. These inhibition percents were treated according to Miller and Tainter's method (Proc. Soc. Exp. Biol. Med. 57, 261 (1944)) and as suggested by Caviezel et coll. (Arch. Int. Pharmacodyn., 141, 331 (1963)), with a view to obtain the average value and the relevant standard error. The validity of this treatment for data has been confirmed by the fact that a dosage on parallel lines—i.e. exploiting the values of the scores as measurement data—has resulted in obtention of effectiveness ratios among the test drugs, which are homogeneous with the value ratios obtained with the method used in the tests.

The values indicating the doses which realized 50% symptom inhibition were referred to the products as bases.

Oxotremorine test

The symptomatology brought about by tremorine treatment is due to an oxidation metabolite or oxotremorine (1-[4-(1-pyrrholidinyl)-2-butynyl] - 2 - pyrrholidinone) of the formula:

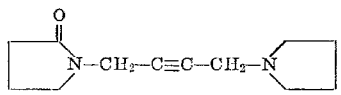

(Cho A.K., Haslett W.L., Jenden D.J., Biochem. Biophys. Res. Commun. 5, 276 (1961); Koesis J.J., Welch R.M., Pharmacologist 2, 87 (1960)). This test is more specific than that with tremorine. As a matter of fact, it has been noted that several tremorinhibiting products do not act so directly as through an antagonism of Tremorine conversion into oxotremorine (Leslie, G.R., Maxwell, D.R. Nature 202, 97 (1964)).

The symptoms of quivering, lachrymation and salivation were taken into consideration for this test. Male mice weighing approximately each 22–25 g. (fasting for 2 hours) were used for the experiments. The test animals were previously treated orally with the various doses set forth below of the test drugs dissolved in distilled water in a volume to product 0.10 ml./10 g. (1-oxo-2-methyl-3 - (aminophenyl-p-ethoxypiperidino)isoindoline hydrochloride preparation took place at the moment of use). Oxotremorine was given after 20 minutes to the mice by intra-peritoneal route in physiological salt solution at a dose of 0.5 mg./kg. in a volume of 0.10 ml./10 g. This dose of oxotremorine was determined in the light of previous tests when it had proved to be the minimal dose to ensure a maximal grade symptomatology. Evaluation was carried out after 20 minutes following the oxotremorine treatment, in a manner similar to the technique adopted for Tremorine test. In this test the values indicating the doses which showed 50% symptom inhibition capacity were also referred to the products as bases.

Nicotin tremor test in rabbits

This test was worked out by Bovet and Longo (Bovet D., Longo V.G., J. Pharmacol., 102, 22 (1952)) and it is based on the fact that synthetic drugs effective against Parkinson's disease can inhibit tremors caused by nicotin administered by intra-venous route.

This test was used in the evaluating of 1-oxo-2-methyl-3-(aminophenyl-p-ethoxypiperidino)-isoindoline effectiveness in parallel with that exerted by trihexyphenidylhydrochloride, of the formula:

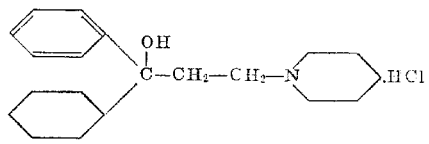

which proved to be the most effective synthetic drug in the treatment of Parkinson's disease on the oxotremorine test.

The tests were carried out in rabbits averaging a weight of 2.200 kg. Eight animals were used for each dose, with a total of 26 control animals. The animals were used in repeated tests, with a week's interval always being allowed to elapse from one test to another. The drugs under tests, dissolved in physiological salt solution (1-oxo-2-methyl-3-(aminophenyl-p-ethoxypiperidino)-isoindoline hydrochloride preparation took place at the moment of use with stoichiometric doses of hydrochloric acid), were given slowly (over a period of 30 minutes) by intra-venous route. 1 mg.kg. 2% nicotin bitarthrate in physiological salt solution was given 5 minutes after the drug administration by intra-venous route through the earedge vein. Nicotin at this posology has produced quivering quite apparent in as many as 88.5% of the test animals.

For evaluation of symptoms the test animals were fixed astride a suitable support with a hind limb left free. The movements of the limb were picked up by two corrugated pipes set at a right angle towards each other, fixed at the malleolus and connected with a Marey drum writing on a cheimograph. By this way it was possible to record even the slightest movements such as quivering in the hind limb, independently of any directions of the movements themselves.

An all- or-nothing criterion was chosen for interpretation of this data, and the figures thus obtained were treated with Miller and Tainter's method to obtain $DE_{50}$ and the relevant standard errors.

Nicotinic convulsion test in mice

This test was used to evaluate the effectiveness of 1-oxo-2-methyl-3-(aminophenyl-p-ethoxypiperidino) - isoindoline and trihexyphenidylhydrochloride, which had proven active on oxotremorine test.

The test was carried out on male mice weighing approximately 20–25 g. each (fastening for 2 hours). 16 test animals were used for each dose, with 8 in the morning and 8 in the afternoon. The drugs were given orally at a posology of respectively 20, 40 80 mg./kg.

30 minutes after the drug treatment, the animals were given nicotin tartrate by intra-peritoneal route at a dose of 15 mg./kg. calculated as a base. At this posology, nicotin administered to mice causes convulsion in 100% of the test animals, with death in 92.5% (percents obtained on 144 control animals). The test drugs were dissolved in distilled water at such concentrations as to produce an administration of 0.2 ml./10 bodyweight.

The animals were observed for 30' after the nicotin was administered, and the number of animals suffering from clonic convulsion as well as the number of deaths were recorded. The resultant data allowed calculation of $DE^{50}$ and relevant standard errors by Miller and Tainter's method.

Reserpin tremor test in mice

Reserpin can produce a Parkinson-like symptomatology, which has already been exploited in monkeys to test the effectiveness of antagonist drugs (Windle W. F. Cammermeyer J., Science 127, 1503 (1958)). This symptomatology is most probably due to the "depleting" effects of reserpin towards brain catecolamins. It is well-known, in fact, that Parkinson's disease symptomatology in man— and interestingly enough, in the experimental tremorine picture in mice—is accompanied by a reduction in brain dopamine stock.

The reserpin test consists in the evaluation of the antagonist effect shown by the test drugs towards the quivering obtained by a previous acute reserpin treatment. As such quivering is not optically appreciable, a particular recording system was prepared to evidence it. 1-oxo-2-methyl-3-(aminophenyl-p-ethoxypiperidino) - isoindoline was tried in this test compared to trihexyphenidylhydrochloride. The experiment was carried out on 20–25 g. male mice. The test animals had been fasting for two hours before the treatment began. Two groups of each 10 animals were used for each test drug. The animals in both groups were treated with reserpin orally at a dose of 50 mg./kg. suspended distilled water containing in 1% carboxymethyl-cellulose+4% Tween 80 in a volume of 0.1 m./10 g. bodyweight. 50 minutes after the reserpin administration, the animals of one group were given the test drug in distilled water at a dose of 40 mg./kg. in a volume corresponding to 0.1 ml./10 g. bodyweight, whilst those in the other groups were given an equal amount of distilled water only.

Interpretation of results took place 40 minutes after the aforementioned last treatment and consisted in recording, by means of an electrocardiograph with "Hellige" preamplifying device, of the generally monotonous tremor issued by the test animals positioned on a diaphragm connected to a particularly sensitive microphone.

The interpretation time was chosen as 1½ hours after previous tests showed that most apparent quivering appears in all animals after 1½ hours. After this length of time the tremors slowly decrease, still holding some level till 3 hours, with further fall to less than half as much after 4½ hours, and eventual disappearance after 6 hours.

Acute toxicity in mice

Acute toxicity of 1-oxo-2-methyl-3-(aminophenyl-p-ethoxypiperidino)-isoindoline has been also tested in mice.

18–20 g. albino rats, all males, fasting for 3 hours, were used for the test. For peroral toxicity test 72 animals were treated with the products under test dissolved in water (with 1-oxo-2-methyl-3-(aminophenyl-p-ethoxypiperidino)-isoindoline salts made at the moment of use) at 2% concentrations, and observed for 72 hours. 60 test animals were used for toxicity tests by the intra-venous route. The text drugs were dissolved in physiological salt solution and administered through a tail vein at 1% concentration. Observation time: 24 hours $LD^{50}$ was calculated as suggested by Litchfield and Wilcoxon (J. Pharmacol., 96, 99 (1949)).

Results

Results of pharmacologic tests carried out with 1-oxo-2-methyl-3-(aminophenyl - p - ethoxypiperidino)-isoindoline are summarized in tables Nos. 1, 2, 3, 4, 5 and in Figure 1. Compared to the number of products known to show anti-pakinson effect, 1-oxo-2-methyl-3-(aminophenyl-p-ethoxypieridino)-isoindoline has proven most effective on the tremorine test (see Table 1). The dose with 50% tremor inhibiting capacity has proved to range in the same order of size as the dose required to inhibit lachrymation, and below the dose required to inhibit salivation.

1-oxo-2-methyl - 3 - (aminophenyl-p-ethoxypiperidino)-isoindoline effects are very active on the oxotremorine test, so that the drug is still more active than the other comparative drugs with anti-Parkinson effectiveness, some of which are totally ineffective at doses below 20 mg./kg. (see Table 2).

Evolution in time of the effect of 1-oxo-2-methyl-3-(aminophenyl - p - ethoxypiperidino)-isoindoline on the oxotremorine test has been investigated in another experiment. As a result (see Picture 1 below), it has been evidenced that the effect is already quite apparent after 20 minutes and reaches its peak after 40 minutes. A progressive decrease then survenes in the effect, which is initially quicker and later on slower, after 80 minutes with the effectiveness about halved.

With regard to quivering caused by nicotin in rabbits, 1-oxo-2-methyl-3-(aminophenyl - p - ethoxypiperidino)-isoindoline proved effective, with $DE^{50}$ of 0.77 mg./kg. (see Table No. 3).

Also trihexyphenidylhydrochloride was investigated by this test, with $DE^{50}$ found to be 1.22 mg./kg.

1-oxo-2-methyl-3-(aminophenyl - p - ethoxypiperidino)-isoindoline was also investigated for anti-nicotin effect in mice, in compared tests with trihexyphenidylhydrochloride (see Table 4). Whilst trihexyphenidylhydrochloride turned practically ineffective, evaluation has been possible for 1-oxo-2-methyl-3-(aminophenyl - p - ethoxypiperidino)-isoindoline, with $DE^{50}$ in 56 and 42 mg./kg. respectively inhibiting nicotinic convulsion and death.

1-oxo-2-methyl-3-(aminophenyl-p - ethoxypiperidino)-isoindoline at a dose of 40 mg./kg. in reserpin tremor tests has proven active with total tremor inhibition in 8 out of 10 test animals, whereas trihexyphenidylhydrochloride turned quite ineffective at the same posology.

The acute toxicity of 1-oxo-2-methyl-3-(aminophenyl-p-ethoxypiperidino)-isoindoline is reported in Table 5 in comparison with the more used anti-Parkinson drugs.

TABLE NO. 1

Inhibition effect displayed by 1-oxo-2-methyl-3-(aminophenyl-p-ethoxypiperidino)-isoindoline and some drugs active against Parkinson's disease towards symptomatology caused in mice by Tremorine treatment at a dose of 20 mg./kg. by intra-peritoneal route. The table shows the doses in mg./kg., orally with 50% reduction capacity upon symptoms and the relevant standard errors (the doses are referred to the products as bases)

| Products or drugs | Number of test animals | Symptoms | | |
|---|---|---|---|---|
| | | Lachry- mation | Salivation | Tremor or quivering |
| 1-oxo-2-methyl-3-(aminophenyl-p-ethoxypiperidino)-isoindoline | 76 | 1.53±0.55 | 1.70±0.36 | 1.56±0.57 |
| Trihexyphenidylhydrochloride | 78 | 6.02±1.65 | 7.67±1.91 | 7.58±3.39 |
| Orphenadrinehydrochloride | 25 | 15.67±2.85 | 21.12±5.11 | 16.72±6.68 |
| Caramipheniumchloride | 93 | 10.81±2.57 | 13.62±2.87 | 11.45±4.85 |
| Profenaminhydrochloride | 62 | 13.40±3.95 | 24.18±7.52 | 13.88±3.69 |

TABLE NO. 2

Inhibition effect displayed by 1-oxo-2-methyl-3-(aminophenyl-p-ethoxypiperidino)-isoindoline and some drugs active against Parkinson's disease towards symptomatology caused in mice by Oxotremorine treatment at a dose of 0.5 mg./kg. by intra-peritoneal route. The table shows the oral doses in mg./kg., with 50% reduction capacity upon symptoms and the relevant standard errors (the doses are referred to the products as bases)

| Products or drugs | Number of test animals | Symptoms | | |
|---|---|---|---|---|
| | | Lachry- mation | Salivation | Tremor or quivering |
| 1-oxo-2-methyl-3-(aminophenyl-p-ethoxypiperidino)-isoindoline | 82 | 3.20±0.50 | 3.10±0.51 | 4.50±0.76 |
| Trihexyphenidylhydrochloride | 36 | 10.71±2.50 | 15.61±5.66 | 17.84±5.41 |
| Orphenadrinehydrochloride | 15 | >20 | >20 | >20 |
| Caramipheniumchloride | 15 | >20 | >20 | >20 |
| Profenaminhydrochloride | 15 | >20 | >20 | >20 |

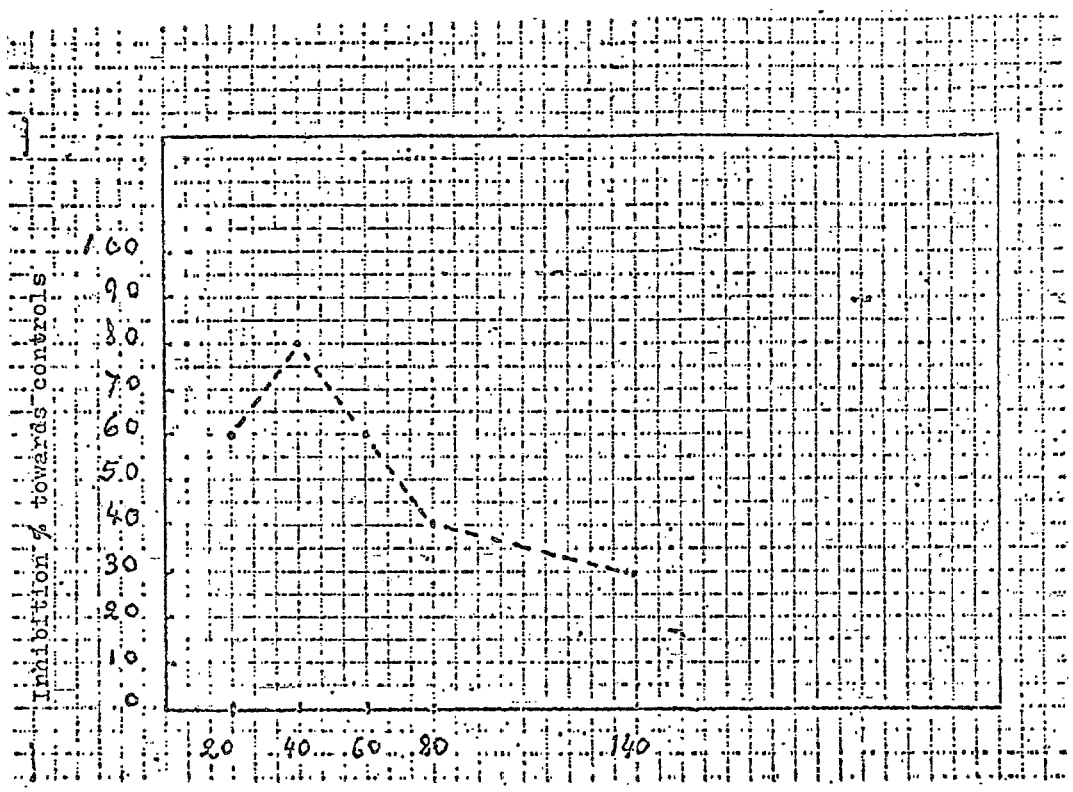

Minutes after 1-oxo-2-methyl-3-(aminophenyl-p-ethoxypiperidino)-isoindoline administration.

Picture No. 1.—Evolution in time of 1-oxo-2-methyl-3-(aminophenyl-p-ethoxypiperidino)-isoindoline effect (10 mg./kg., orally) on quivering produced in mice by intra-peritoneal administration of 0.5 mg./kg. oxotremorine (results were always recorded 20 minutes after oxotremorine was given).

TABLE NO. 3

Inhibition effect displayed by 1-oxo-2-methyl-3-(aminophenyl-p-ethoxypiperidino)-isoindoline and trihexypheni-dylhydrochloride towards tremor produced in rabbits by nicotin treatment at a dose of 1 mg./kg. (basic drug) by intra-venous route. The table shows the different $DE^{50}$ in mg./kg. and the relevant standard errors (doses referred to products as bases)

| Products or drugs | Number of test animals | Inhibition of tremor $DE^{50} \pm E.S.$ in mg./kg., by intra-venous route |
|---|---|---|
| 1-oxo-2-methyl-3-(aminophenyl-p-ethoxypiperidino)-isoindoline | 40 | 0.77±0.24 |
| Trihexyphenidylhydrochloride | 40 | 1.22±0.27 |

TABLE NO. 4

Inhibition effect displayed by 1-oxo-2-methyl-3-(aminophenyl-p-ethoxypiperidino)-isoindoline and trihexyphenidylhydrochloride towards convulsion and death caused in mice by nicotin treatment at a dose of 15 mg./kg. (basic drug) by intra-peritoneal route. The table shows the different $DE^{50}$ in mg./kg. orally and the relevant standard errors (doses referred to products as bases)

| Products or drugs | Number of test animals | Inhibition ($DE^{50} \pm E.S.$ in mg./kg. orally) | |
|---|---|---|---|
| | | Convulsion | Death |
| 1-oxo-2-methyl-3-(aminophenyl-p-ethoxypiperidino)-isoindoline | 48 | 56±1.46 | 42±0.93 |
| Trihexyphenidylhydrochloride | 48 | >80 | >80 |

TABLE NO. 5

Acute toxicity caused in mice by 1-oxo-2-methyl-3-(aminophenyl-p-ethoxypiperidino)-isoindoline and some other drugs active against Parkinson's disease

| Product | $LD^{50}$ by mouth | $LD^{50}$ intra-venous route |
|---|---|---|
| 1-oxo-2-methyl-3-(aminophenyl-p-ethoxypiperidino)-isoindoline | 210 | 62.8 |
| Trihexyphenidylhydrochloride | 170 | 39 |
| Orphenadrinehydrochloride | 100-150 | 20-35 |
| Caramipheniumchloride | 180 | 67.5 |
| Profenaminhydrochloride | 250 | 45-50 |

Sub-chronic and chronic toxicity tests have been carried out with 1-oxo - 2 - methyl - 3 - (aminophenyl-p-ethoxypiperidino)-isoindoline in mice (1, 5, 10, 20 mg./kg.) and dogs (0.15 and 1 mg./kg.) for three months; no toxicity signs affecting the main functions and the most important parenchymal tissues were ever evidenced. Teratogenic tests in rats (5 and 20 mg./kg. throughout pregnancy) have also been negative.

Tolerance tests 1-oxo - 2 - methyl - 3 - (aminophenyl-p-ethoxypiperidino)-isoindoline was administered to voluntary test patients orally at single steadily-increasing doses starting from a 0.5 mg. dose. Each single dose was tested on 5 patients, who were partly replaced for each single dose.

Following investigations were carried out in each test patient before drug administration and 15, 30, 60, 120, 150, and 180 minutes after drug administration:

(1) Pupillary diameter
(2) Sialorrhea
(3) Pulse rate

Clear signs of activity on the vegetative system were evidenced only by doses exceeding 40 mg. in all test patients who exhibited:

Moderate mydriasis (average pupillary diameter: from 3.4 mm. to 3.6 mm.),

Dryness of throat (average salivary secretion: from 0.5 ml. to 0.2 ml.), and

Increased frequency of pulse (average value: from 70 pulsations/min. to 78).

No troubles in behavior, giddiness, headache, sickness or gastric pyrosis ever appeared, nor were any alterations recorded in blood constitution or in liver and kidney functionalities.

Clinical pharmacological tests

Tests were carried out in a neurologic clinic on 20 patients with Parkinson's disease in the same evolution stages. The test patients showed both symptoms of tremor and rigidity at a time.

The test was carried out in comparison with placebo under double blindness conditions, and each test patient received both treatments. The test drugs, packed in identical capsules, were given at 8 a.m. by the mouth for three days on the run each, with 7 days interval allowed to elapse between one treatment and the other. Both treatments, 1-oxo - 2 - methyl - 3 - (aminophenyl-p-ethoxypiperidino)-isoindoline at a 10 mg. dose and the placebo, were given at random sequences.

Following examinations were carried out at 10 a.m. for three days before treatment and during the test days:

(1) Tremor: the time was calculated as required by the test patient to design a pre-established geometrical drawing, also keeping into account the patient's executive capacity.

(2) Rigidity: evaluated by the treating physician on a score ranging from 0 to 4. (0 no rigidity; 4 maximum rigidity.)

Results:

(1) Drawing execution times:
  Basic: 185"
  Placebo: 178"

1-oxo - 2 - methyl - 3 - (aminophenyl-p-ethoxypiperidino)-isoindoline: 125"

(2) Rigidity:
  Basic: 3
  Placebo: 3

1-oxo - 2 - methyl - 3 - (aminophenyl-p-ethoxypiperidino)-isoindoline: 0.5

No adverse side effects were noted on any of the test patients.

Additional clinical pharmacologic tests to identify the anti-Parkinson effects of 1-oxo-2-methyl-3-(aminophenyl-p-ethoxypiperidino)-isoindoline were carried out in hospitals with patients suffering from Parkinson's disease, with a "double-blind" technique in comparison with control humans treated with placebos. Rigidity and quivering were taken as parameters for evaluation, whilst writing, evaluated on scores, was looked upon as a visualization means. 1-oxo - 2 - methyl - 3 - (aminophenyl-p-ethoxypiperidino)-isoindoline, at a dose of 5 mg. per patient, showed a significant moderating capacity (Student's test) upon the symptoms typical to Parkinson's disease.

In the light of the above data a tablet with the following composition is suggested for the treatment of Parkinson's disease:

| | Mg. |
|---|---|
| 1-oxo - 2 - methyl - 3 - (aminophenyl-p-ethoxypiperidino) - isoindoline | 10 |
| Lactose | 40 |
| Starch | 23 |
| Methylcellulose | 23 |
| Talc | 4 |
| | 100 | of course, the above composition can vary widely, as is evident to those skilled in the art. 1-oxo - 2 - methyl-3-(aminophenyl - p - ethoxypiperidino) - isoindoline can also be administered by means of ampouls and suppositories. 1 - oxo - 2 - methyl - 3 - (aminophenyl-p-ethoxypiperidino)-isoindoline exhibits anti-Parkinson effectiveness over a wide range of dosage levels. For an adult, the average dose of 1-oxo - 2 - methyl - 3 - (aminophenyl-p-ethoxypiperidino)-isoindoline is conveniently 10 mg., although the effective dosage level may vary from 5 mg. to 15 mg.

What is claimed is:

1. The therapeutic treatment of Parkinson's disease, said treatment comprising administering to a patient having Parkinson's disease a therapeutically effective amount of 1 - oxo - 2 - methyl - 3 - (aminophenyl-p-ethoxypiperidino)-isoindoline and therapeutically acceptable salts thereof.

2. The treatment of claim 1, wherein said salts are salts of hydrochloric, sulfuric, citric or tartaric acids.

3. The treatment of claim 1, wherein said amount is 5 to 15 mg.

4. The treatment of claim 1, wherein said amount is about 10 mg.

No references cited.

STANLEY J. FRIEDMAN, Primary Examiner